United States Patent [19]
Neuhaus

[11] Patent Number: 6,113,393
[45] Date of Patent: Sep. 5, 2000

[54] RAPID AUTOMATIZED NAMING METHOD AND APPARATUS

[76] Inventor: Graham Neuhaus, 10906 Little Lisa, Houston, Tex. 77024

[21] Appl. No.: 08/958,554

[22] Filed: Oct. 29, 1997

[51] Int. Cl.[7] .................................................... G09B 17/00
[52] U.S. Cl. .......................... 434/178; 434/156; 434/169
[58] Field of Search ..................................... 434/178, 156, 434/157, 169, 185, 118, 307 R, 308, 322, 323, 362; 704/1, 9, 200, 205, 207, 208, 211–214, 220, 221, 231, 248, 251, 258, 269, 270

[56] References Cited

U.S. PATENT DOCUMENTS

| 3,881,059 | 4/1975 | Stewart ..................................... 434/185 |
| 4,245,405 | 1/1981 | Lien et al. ............................... 434/178 |
| 4,641,343 | 2/1987 | Holland et al. .......................... 434/185 |
| 4,969,194 | 11/1990 | Ezawa et al. . |
| 5,340,316 | 8/1994 | Javkin et al. . |
| 5,536,171 | 7/1996 | Javkin et al. ............................. 434/185 |

OTHER PUBLICATIONS

Yoshiyuku Horii, "An automatic analysis method of utterance and pause lengths and frequencies," 1983, pp. 449–452.

Yoshiyuku Horii and Peter R. Ramig, "Pause and Utterance Durations and Fundamental Frequency Characteristics of Repeated Oral Readings By Stutters and Nonstutterers," 1987, pp. 257–268.

Kevin J. Hawley and Eugene J. Izatt, "An inexpensive sound–activated switch for experiments measuring vocal–response times," 1992, pp. 523–527.

Joan Welkowitz, Ronald N. Bond, John Zelano, "An automated System for the Anal of Temporal Speech Patterns: Description of the Hardware and Software," pp. 347–364.

Martha Bridge Denckla and Rita Rudel, "Rapid "Automatized" Naming of Pictured Objects, Colors, Letters and Numbers by Normal Children," pp. 186–201.

Samuel W. Anderson, Frances Nash Podwall, and Joseph Jaffee, "timing Analysis of Coding and Articulation Processes in Dyslexia," pp. 71–86.

Kevin J. Hawley and Eugene J. Izatt, Computer Technology, 1992, pp. 523–527.

Primary Examiner—Valencia Martin-Wallace
Assistant Examiner—Sheila Clayton
Attorney, Agent, or Firm—Streets & Associates; Jeffrey L. Streets

[57] ABSTRACT

The present invention provides a method for analyzing reading skills comprised of recording and digitizing sound waves generated by a subject's voice in response to a series of stimuli. The sound waves are decomposed into sequences of articulation and pause periods. The articulation and pause periods are determined by first scanning the generated sound waves and identifying locations along the sound waves where the sound amplitude raises above or drops bellow a given value. The reading ability of the subject is profiled by analyzing the series of pause and/or articulation periods. The method allows for the diagnosis of reading deficiencies. Based on the diagnosed deficiencies in the subject's reading skills, drill exercises are proposed and rounds of testing and drill exercising are repeated until the diagnosed reading deficiencies are corrected. The method is particularly suitable for use in conjunction with computerized equipment. A particular type of tests used in conjunction with this invention is the Reading Automatized Naming test (R.A.N.). The method and device of this application comprise presenting a subject with a set of R.A.N.

21 Claims, 9 Drawing Sheets

RAPID AUTOMATIZED NAMING METHOD AND APPARATUS

FIELD OF THE INVENTION

This invention relates to the field of speech analysis and more particularly to the field of automatized analysis of reading tests and methods diagnosing and correcting reading deficiencies.

BACKGROUND OF THE INVENTION

The field of mental chronometry has focused on the measurement of cognitive processes through the use of paradigms designed to isolate and quantify lower level elementary mental processes. Some of these elementary processes include visual scanning; stimuli discrimination, registration, and encoding; representational retrieval from memory; and speed or degree of automatization of learning. It is thought that every task requiring cognition involves three components: task relevant knowledge, problem solving strategies, and information processing efficiency. Together these components determine performance of behaviors. The degree of task-relevant knowledge may influence strategies that humans use to solve problems, as increasing amounts of knowledge lead to awareness of differing strategies and ways to use the knowledge. In addition, it has been demonstrated that familiarity with a task may not only influence how quickly the response is initiated, but also the quality and/or quantity of the executed task. An example of this dual influence is the demonstration that knowledge of a linguistic variable influences not only how quickly a verbal response is initiated, but also the duration of the pronunciation. It is possible to design studies to severely limit the influence of both declarative knowledge and cognitive strategies. This purposeful design allows the researcher to concentrate on the information processing component of the task. It is this part of any cognitive task that is investigated by chronometric researchers.

The investigation of basic information processes involves two outcome measures: reaction time and response accuracy. These two dependent dimensions produce measures of speed, accuracy, and speed-accuracy tradeoffs, however they do not allow inference concerning mental strategies used to produce overt responses or interpretation of how mental processes are temporally ordered. This field of research has been able to very precisely determine cognitive processing duration, yet it has been unable to definitively determine whether cognitive processing occurs in a strict serial manner, or whether different processes temporally overlap.

Traditional information processing models assumed that discrete cognitive processes occurred in a serial order, but that assumption has been replaced by a model of processing in which several processes occur simultaneously with a continuous flow of activation going from one process to another. It has been suggested that the number of cognitive processes differ from task to task and that response preparations most likely reflect task complexity. Further findings stemming from a lexical decision task support the postulate that information is accumulated gradually, consistent with the activation model of connectionist theorists. Regardless of the temporal congruity or incongruity of the timed cognitive processes, an important underlying assumption concerning measurement of cognitive processing ability is the premise that lower level mental processes, such as stimulus registration or identification, and response selection are completed prior to the onset of overt behavioral responses. Examples of chronometric paradigms are simple reaction time tasks (SRT), choice reaction time tasks (CRT), inspection time tasks (IT), and Posner's paradigm task. Simple reaction time tasks are often used as a baseline for stimulus registration, and a more complex task, such as a choice reaction task, is given along with an SRT. By subtracting the simple reaction time from the more complex choice task time, researchers have an index of decision time.

The Posner paradigm is especially relevant to the issue of reading, as this paradigm measures recall of letters and digits. The presupposition of this task is that the stimuli being recalled have familiar over-learned content, and consequently the latency of the response is not a measure of declarative knowledge, but a measure of how automatically one can identify the stimulus. Automaticity assumes that a cognitive skill has been over learned to the point that one is able to minimize conscious effort in the execution of the task.

Mental chronometry has been used to infer mental processes in reading and mathematics, as well as in other areas of educational interest. The Posner paradigm and similar tasks that commonly measure identification and retrieval of letters, digits, and words have been widely used in the study of reading.

Skill in recognizing words has been shown to be strongly related to the speed in which one acquires beginning reading proficiency. Predictably, the development of word recognition skills leads to increased reading comprehension.

Verbal retrieval can be used to measure the relative difference or similarity in the retrieval process of bilingual children, and can be used to measure general rates of cognitive processing, or specific rates of cognitive processing within a particular domain. Additionally, the study of naming can occur before a child is able to read, and therefore may prove to be an excellent predictor of beginning reading proficiency.

Two types of naming tasks have been studied in relation to reading: the continuous-list procedure, and the confrontation or discrete-trial tasks. A discrete-trial task is a procedure that asks the subject to respond with the identifying word as quickly as possible when a stimulus is flashed on a computer screen. This type of procedure differs from the continuous-list type procedure as it does not display stimuli typical of more ecologically valid naming tasks which include mental recognition and sequencing of the stimuli. Proponents of the continuous-list procedure suggest that the continuous-list type of task captures the very elements that naming and reading both share, specifically lexical retrieval that requires complex scanning, sequencing, and processing of continuously presented material. It has further been suggested that during the discrete-trial procedure, the only thing that can be measured is the speed with which one names a single stimulus, and this eliminates the opportunity to quantify serial and simultaneous processing that is so inherent in the act of reading.

Continuous-list rapid naming tasks have been shown to be powerful predictors of beginning reading ability. Specifically, rapid automatized naming has been shown to differentiate young normal readers from young dyslexic readers, and more specifically to distinguish dyslexia from other types of learning disabilities. Rapid automatized naming has also been shown to be an effective discriminator of dyslexic adolescent and adult students, to differentiate basic mathematical proficiency in learning disabled and non-disabled groups of children, and to differentiate right and left brain lesioned children. Further, an association between rapid automatized color naming and intelligence has been found for pre-reading girls.

One continuous-list procedure that captures the elements of reading in a non-reading task is the Rapid Automatized Naming Test (R.A.N.) R.A.N. was developed to detect subtle anomic qualities in children as well as to measure children's automatization skills requiring rapid serial verbal responses to common stimuli.

Originally R.A.N. was developed as nine different charts prepared to assess children's skill in verbal retrieval. Original sub-tests included: (1) Colors—red, green, black, blue, yellow (2) Numerals—2,6,9,4,7 (3) High Frequency Capital Letters—A, D, S, L, R, (4) Animals—dog, cat, cow, squirrel, bird (5) Lower Case Letters with low frequency "q"—b, q, e, c, i (6) Objects of Use—comb, key, watch, scissors, umbrella (7) Low Frequency Capital Letters—V, U, H, J, F (8)Random Objects—flag, drum, book, moon, wagon (9) Lower Case High Frequency Letters—p, o, d, a, s. Each chart had pictures of five different items repeated and arranged in random order to fill five horizontal rows of ten items each. The examiner familiarized the child with the items on each chart and then asked the child to name each item on the chart as quickly as possible. The child was timed on each chart and the resultant time indicated the score on the individual test.

There is evidence that the ability of the R.A.N. to identify differential reading ability is dependent upon the age at which the test is administered, the sub-test or sub-tests of the R.A.N. that are used, and the nature of the reading task that the R.A.N. is correlated with. It has been found that R.A.N. tasks adequately predict beginning reading, however correlation between naming speed and second grade reading was not as predictive as correlation at lower grade levels.

Another R.A.N. limitation is that the sub-tests are not equally predictive at differing ages. R.A.N. scores on the objects and colors sub-tests predict reading variance best for kindergarten subjects, however by first grade the letters sub-test consistently accounts for more reading variance than the other R.A.N. measures. This phenomenon is most likely due to the fact that the letters sub-test shares a source of declarative knowledge with the dependent reading measure. Interestingly, by the second grade, in the studies that used both R.A.N. letters and numbers to predict reading, the numbers task was found to predict reading slightly better than the letters task. This uneven prediction leads one to hypothesize that by second grade declarative knowledge predicts reading scores, however, the speed with which one manipulates abstract symbolic knowledge mediates that knowledge.

The usefulness of R.A.N. is limited because its sub-tests do not measure a solitary trait.

The test was designed to measure automaticity of word retrieval, but in reality this word retrieval measure consists of visual registration, sequencing and encoding of the stimulus, lexical retrieval, articulatory motor planning, and finally articulation of the stimulus. Further, the temporal organization of the cognitive processes involved in the task is still under debate. It is unclear as to whether word retrieval processes are discrete serially occurring processes or whether processes are better characterized as gradually activated with an undetermined amount of temporal overlap. The usual administration and timing of the R.A.N. does not allow one to definitively know which of the above factors truly accounts for the majority of the variance in correlation with reading. Sources of variation between individuals on this test include differences in cognitive processing time used for visual encoding or registration, access and retrieval of the verbal label, articulation duration, and interactions among the variables. Consequently, it is difficult to understand which R.A.N. factor really shares the most variance with reading.

The lack of clarity with respect to the sub-processes of the R.A.N. has been addressed by quantifying two behaviors. Articulation time and pause time as sub-process measures have been used in quantifying the portion of the total response time that each sub-process contributed. The division of the R.A.N. total response time into these two sub-processes allows calculation of the duration of the actual articulation time and the actual pause preparation time needed to register, encode, retrieve, and plan an articulation. Pause time is interpreted as the cognitive processing time that it takes an individual to ballistically trigger an overt response to the stimulus. In information processing terms, the pause time may be referred to as an index of the automatization of one's lexical access, verbal retrieval, or retrieval of phonological codes.

Thus, it would be highly desirable to provide methods and techniques that allow for the diagnosis of reading deficiencies by analyzing the pause and articulation times and correlating these times with a particular reading pattern. Such methods would be even more desirable if they were computerized so that subjects can interact with a machine. Computerized tools are particularly desirable for the flexibility and accuracy in their implementation and operation. Fully computerized analysis of pause and articulation times would not only provide more speed and accuracy in detecting and correcting reading deficiencies, but would also provide accessible tools that can be used by individuals having little or no expertise in cognitive processes. Computerized tools that can be operated by the subjects themselves with no or little supervision would offer a particularly attractive solution to present supervision intensive learning techniques.

SUMMARY OF THE INVENTION

The present invention provides a method for analyzing reading and attentional skills comprised of recording and digitizing sound waves generated by a subject's voice in response to a series of stimuli; wherein the digitized sound waves are characterized by sets of points, each point having a time coordinate and a sound amplitude coordinate; and decomposing each sound wave into a sequence of articulation and pause periods wherein each articulation period is defined by an articulation onset point and an articulation offset point; and each pause period is defined by a pause onset point and a pause offset point; and analyzing the sequence of articulation and pause periods.

In one method provided by the present invention, articulation onset points may be set along the sound waves at points where wave amplitude increases to exceed a given first cutoff value, and articulation offset points may be set along the sound waves at points where wave amplitude drops below a given second cutoff value; and wherein for each set of first and second articulation onset points separated by an articulation offset point, articulation and pause periods may be determined based on the time coordinates of the first and second articulation onset points and the time coordinate of the articulation offset point.

In another method also provided by the invention, pause onset points may be set along the sound waves at points where wave amplitude drops below a given first cutoff value, and pause offset points may be set along the sound waves at points where wave amplitude increases to exceed a given second cutoff value; and wherein for each set of first and second pause onset points separated by a pause offset point, pause and articulation periods may be determined based on the time coordinates of the first and second pause onset points and the time coordinate of the pause offset point. Alternatively, pause periods and/or articulation periods may be calculated in any feasible manner, including the use of one or more times that are turned "on" at an onset point and "off" at an offset point.

The invention also provides for the determination of a mean noise level associated with the recorded sound waves and setting the mean noise level as the zero point of the sound wave amplitude scale. In one aspect of the invention, amplitude cutoff values may correspond to the mean noise level.

The invention also provides for analyzing pause periods and determining the subject's reading and attentional profile, the profile comprising a number of indicators characterizing diagnosed reading or attentional deficiencies in the subject's reading skills The present invention also encompasses providing the subject with letter retrieval, recognition, and articulation drill exercises to correct the diagnosed reading deficiencies.

In another aspect the invention provides for analyzing articulation periods and determining the subject's reading profile, the profile comprising a number of indicators characterizing diagnosed reading deficiencies in the subject's reading skills.

The invention may also determine the subject's reading and attentional profile through analysis of the frequencies of the sound waves associated with the subject's response to presented stimuli. In particular, the invention encompasses a method for analyzing reading and attentional skills, comprising: providing a series of naming elements; detecting a response as a user reads the naming elements; and analyzing the frequencies of the responses. Particularly, the naming elements or other stimuli may be sub-tests selected from the R.A.N. battery of reading tests.

The invention also encompasses a speech analysis device for the detection and correction of reading skills comprising: a) means for recording and digitizing sound waves generated by a subject's voice, b) means for decomposing digitized sound waves into a sequence of articulation periods and pause periods; and c) means for analyzing a sequence of articulation and pause periods.

The present invention encompasses a speech analysis device comprising means for diagnosing reading deficiencies by analysis of a sequence of articulation and pause periods. The invention may further comprise means for interactively providing letter retrieval, recognition, and articulation drill exercises for the correction of diagnosed reading deficiencies.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention provides a method and apparatus for analyzing speech during a reading test such as a rapid automatized naming (R.A.N.) test, in order to measure reading ability. Unlike conventional naming tests, which measure only the total time taken to read certain material, the present method and apparatus determine the pause time between individual characters and the cumulative pause time over the entire test.

In one aspect of the invention, the method is performed by a software application, in the form of either a program or subroutine, that includes or interacts with speech digitizing equipment and/or other software for purposes of analyzing certain characteristics of the speech. Unlike voice recognition devices and software which look for various wave formats consistent with a database of words, the present invention uses various criteria for measuring the duration of articulation and/or pause between voicings made by a subject.

In another aspect of the invention, a R.A.N. sub-test chart is read by a subject into a microphone connected to a pause calculating member, such as a recording device or a multimedia computer. When a recording device is used, the data is digitized and transferred to a computer for processing. The transfer step is not needed when the chart is read into a microphone directly connected to a computer. For each reading sub-test, a sound file is generated. The sound file comprises all the utterances by the subject from the start of the sub-test to the end of the sub-test. The data in the sound file corresponds to a sequence of sound waves defined by the variation of the wave amplitude as a function of time. The wave amplitude can also be presented as the acoustic energy level associated with the subject's utterances produced during the administration of the sub-test. The time frame between encompassing the start and the end of the sub-test is designated as the sub-test total time.

In a further aspect of the invention, each sub-test total time is divided into two components, pause and articulation times Total Time=Articulation time+Pause Time Total articulation time consists of the summation of all correctly sequenced responses to the displayed stimuli. Pause time consists of the summation of all silences and extraneous noises including spontaneous speech between the appropriately sequenced articulations.

Figure 1:
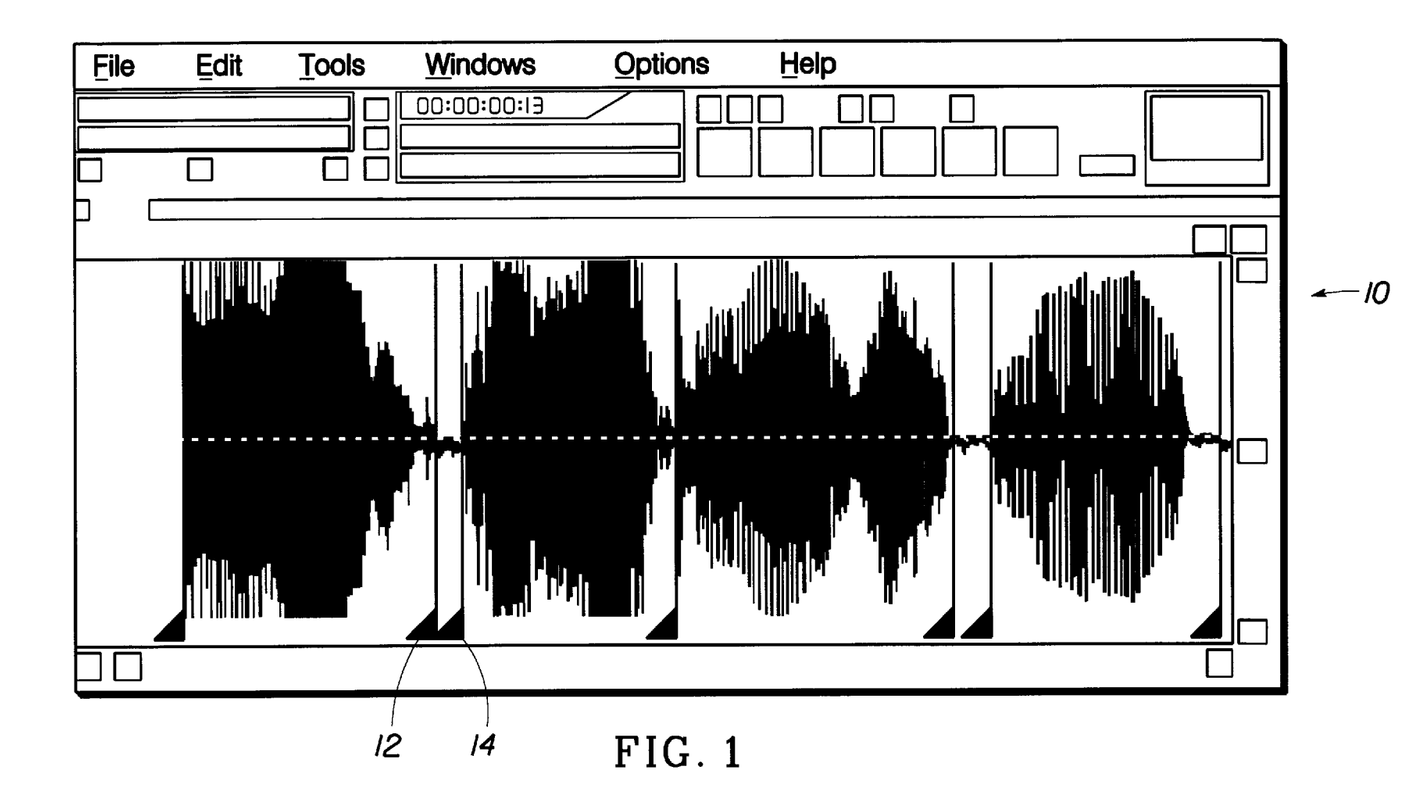
FIG. 1 is a graph illustrating a computer generated trace of a sound file.

FIG. 1 is a graph illustrating a computer generated trace of a sound file 10. The figure illustrates the variation in the acoustical energy level as individual elements in a given R.A.N. sub-test are read by the subject. Each individual element in a sub-test can also be considered as a stimulus to which the subject responds by making utterances.

In one aspect of the invention, articulation onset may be determined to be at the point where the existence of properly sequenced meaningful acoustical energy exceeds the mean noise level for a given duration. Conversely, offset may be determined to be at the point where meaningful acoustical energy drops below the mean noise level for a given duration. Onset and offset criteria are established either manually, after careful acoustic and/or visual consideration of the audio wave shapes created by articulation of the letter, number, or object stimuli, or automatically, such as by computerized analysis of the digitized waves.

In another aspect of the invention, the duration of a pause is measured as the time period between first and second flags, where the first flag 12 is set when the amplitude of the speech (volume) drops below a first set-point amplitude and the second flag 14 is set when the amplitude of the speech rises above a second set-point amplitude that is the same or a different amplitude from the first set-point amplitude.

In yet another aspect of the invention, the first and second set-points may be the same and may also have an amplitude equal to the mean value of the background noise level. The mean background noise level may be assessed by scanning the entire sound file, identifying the noise that can be distinguished from the subject's utterances and determining a mean amplitude for such noise. Alternatively, the mean value of the background noise level may be determined by any conventional method, including measurement of noise during a pre-test or post-test period without any articulations or using a standard value for background noise in a given environment.

Yet another aspect of the invention provides a subroutine for the analysis of the generated sound files. The subroutine determines a mean noise level for each sound file. Once a mean noise level has been determined, the wave zero amplitude point is set at the mean noise level. A scanning of the sound file allows the positioning of flag points corresponding to the start and end points of articulation and/or pause periods. In determining the start and end points, the subroutine is preferably capable of using default parameters as well as parameters entered by the user for each individual run. Parameters that are used by the subroutine comprise the wave amplitude and duration cutoff values for determining the start and end points for articulation and/or pause periods. For each sub-test, the subroutine preferably generates tables containing the pause and articulation durations associated with each item in the sub-test. The tables may then be stored and used in computing the total sub-test time, the total articulation time, and total pause time. The stored tables may then also be used in several other statistical computations such as means and variances of data from one sub-test or several sub-tests. In this particular implementation of the invention, excellent correlation between the test results and the reading ability of the subject may be obtained.

In a preferred method of the invention, the flags may be set only after the set-point amplitude has been achieved for a short period, such as 5 milliseconds, resulting in greater accuracy and consistency in identifying pause and articulation onset and offset points. Spikes of amplitude greater than the set-point which do not exceed the required period, such as 5 milliseconds, may therefor be disregarded. Other methods of filtering or smoothing the data, as will be apparent to one of skill in the art, may also be used in accordance with the invention.

In another aspect of the invention the traces of the sound waves generated during a sub-test are printed. Each articulation duration may be hand marked at the onset and offset points. Articulation duration is determined to be the time between onset and offset. Pause duration or cognitive processing speed is determined to be the time between the articulations. Total time of each R.A.N. file is measured from the onset of the first articulation to the offset of the last articulation.

Variations of the invention may be employed, such as analyzing pause times in an object naming test (indicative of general cognitive processing speed) and subtracting this from the pause time in the letter naming test to arrive at a score indicative of the processing speed specific to letters (the best known indicator of reading ability).

One advantage of this invention is that cumulative pause time has been shown by the inventor a much more accurate indicator of reading ability than total time, and provides insight into the nature of the reading problem, i.e., cognitive processing speed and consistent attentive concentration effort. In accordance with the invention, the results of the analysis may be used to generate one or more scores that can direct the use of conventional teaching techniques.

Another aspect of the invention provides for the pause/articulation reading analysis to be incorporated, in whole or in part, into an interactive software program where the results of the reading test or any similar speech analysis is used by the software, such as to determine the timing of the next stimulus, the next test or to customize or control how the program operates. For example, the present invention encompasses educational and entertainment software programs that analyze portions of a subject's speech, diagnose any deficiencies in the subject's reading skills, and interactively direct the subject to one or several exercises, games, stories, or activities that are designed to provide improvement in the detected deficiencies, decreases in cognitive response times to visual stimuli, or increased focus and sustained attention to visually presented material. The types of activities or drills that the program provides are chosen and modified to address a particular reading deficiency.

The tools of the present invention provide for determining the attentional and reading profile of the subject based on the analysis of the frequencies of the sound waves associated with the subject's responses to a set of stimuli. Although frequency analysis is particularly preferred in conjunction with aspects of the invention comprising automatic pattern recognition, frequency analysis may be combined with the pause and/or articulation analyses described herein. One aspect of the invention provides a method for analyzing reading and attentional skills, comprising: providing a series of naming elements; detecting a response as a user reads the naming elements; and analyzing the frequencies of the responses.

In one aspect of the invention, the automatized analysis tools of this invention are incorporated in educational and pedagogical strategies that can be used by teachers and parents in helping children with beginning reading tasks. Direct instruction, repetition, and drill of letter names and sounds are particularly suitable for automatized implementation on a computer. The fully computerized aspect of this invention offers an integrated system for the collection of data from a subject, automatized processing and analysis of the data, diagnosis, and suggestion of targeted drills for the correction of any diagnosed deficiencies.

The interactive aspects of the invention encompass presenting a subject with visual stimuli and automatically analyzing the subject's response to the presented stimuli. Particularly, the subject is presented with successive stimuli, the selection of a given stimulus being based on on-the fly, immediate, continuous, or cumulative analysis of the subject's responses to previous stimuli.

Connectionist studies have determined that frequency of exposure is a determinant of reaction time. Practice makes better, or at the very least, faster. The tools provided by the present invention allow for maximizing learning potential by individualizing the speed of delivery of visual stimuli. The speed with which a subject is presented with a series of stimuli may be increased or decreased in response to the progress made by the subject in responding to the stimuli. The invention also encompasses using consistent wording with the subjects. Particularly, proposed tasks such as "say the sound" or "name this letter", may use consistent letter and number shapes. The invention also encompasses keeping the letter name and sound activities individually paced, and providing many multi-sensory opportunities for repetition and practice in order to encourage knowledge of physical shape and design of letters and numbers. The tools of the present invention may cue students to correct answers by modeling correct responses, rather than allowing a wrong student response to be initiated and then disregarded. Students build on their own successes and are more likely to recall a correct response if they have repeated it than if they have self-generated an incorrect response which they then need to consciously disregard.

Another aspect of the invention provides a flexible platform that allows teachers to add new sub-tests that are particularly designed to diagnose and/or correct learning deficiencies in a particular individual or group of individuals. In addition to the battery of sub-tests included in the basic version of the software, the application may include modules that allow entry and use of other sub-tests. Educators can build success into any strategy by introducing new information such as letters, numbers, and procedures associated with them, in small increments. This invention leads to particularly successful results when the introduction of specific material is coupled with continual practice of previously taught letter and number shapes and sounds. In using the tools provided by this invention it is preferred that the introduction of new material is delayed until the student has demonstrated mastery of the material previously included in the basic version of the software. In other words, let the student lead the teacher's or computer's progression through the material. This concept may be implemented in the present invention by storing test results over a period of time and introducing new elements into the test after the student has mastered a previous test.

In yet another aspect of the invention, interactive communication between the tools provided by the invention and the student may be initiated by allowing the software application to register sample responses to stimuli presented to the student. The interaction between the subject and the present application may then proceed by presenting the student with stimuli that are analyzed based upon the samples initially registered. It should be recognized that improvements in speech recognition software and equipment, i.e. that allows a device to distinguish an "a" sound from an "e" sound, etc., may eliminate the need to register sample responses prior to testing.

When the software detects a discrepancy between the expected response (based on the stimuli or naming elements displayed) and the response actually obtained, non-articulation time may be accumulated until a response provided by the subject coincides with a response expected by the application at which time articulation time may be credited. It must be noted that various criteria may be incorporated in the application so that articulation onset is appropriately identified. For example, the invention provides for dynamic determination of "valid" sequences of articulations separated by actual pause periods. If the subject provides responses which misarticulate one or several consecutive stimuli, articulation time during which one or more misarticulations occur may be counted as pause time until correct or valid response is made, or alternatively, both articulation and pause durations associated with the misarticulated items may be automatically dropped from the evaluation. Recognizing that misarticulations may occur and the subject may proceed with subsequent naming elements, the software may include logic that resets the next expected response whenever a misarticulation is followed by a set number of responses which correspond with a sequence of naming elements that occur somewhere following the misarticulation.

The application comprises criteria that determine whether a particular response or set of responses are dropped from the evaluation. Alternatively, when a supervisor is present, the supervisor may make an entry that indicates to the application that specific portions of the subject's response must be discarded.

In using the flexible modules of this invention, specific learning tests can be tailored to a particular stage of learning and used by the software applications of this invention. For example, some children may have extraordinary difficulty recognizing and recalling letter names and sounds. Specialized testing should be initiated to determine if underlying phonological or attention difficulties exist. Some children may need an intervention designed to enhance phonological processing or to elongate sustained attentional focus. Attentional inefficiency may cause lack of acquisition of phonological skills needed to process linguistic information, and consequently an attentional intervention based on the tools provided by the present invention would be most appropriate.

Another advantage of the fully computerized aspects of this invention is that supervision by an educator is not necessary. Through interactive communication with a computer, the subject's learning deficiencies are automatically diagnosed and adequate correction exercises are provided to the subject. The computerized tools of this invention allow for automatic monitoring of the progress of the subject.

The following example shows the function of this invention and some of its preferred embodiments as to the automatized analysis of sound files generated in conjunction with a set of R.A.N. tests.

EXAMPLE

A study was made to determine the intra- and inter-sub-test cognitive processing development of a cross section of 73 kindergarten, first, and second grade students. The subjects in this study consisted of 73 students, aged 5.4–8.3 years. All subjects were recruited from a large urban school district in Houston, Tex. All subjects attended the same elementary school. The school's population is racially and ethnically diverse and ranged from lower middle class to upper middle class with regard to socioeconomic status. The ethnic makeup of the children included in the study is reflective of the racial diversity of a large urban school population located in the southwestern United States.

Subjects were randomly chosen from among the available subject pool of regular education students in kindergarten, first, and second grades. All students were participating in regular education classes, and had not been retained in any grade level at school. All participants were not presently nor had ever been placed in special educational classes due to any mental retardation, emotional disturbance, learning disability, or speech or language dysfunction. Further, all subjects participating in this study were primarily English speakers. Students speaking English as a second language were excluded from participation. All subjects were free from obvious stuttering and blatant articulation disorders. Signed written parental consent and subject verbal assent were both obtained before testing was begun.

Presented below are the results of this study which was designed to investigate the differences between R.A.N. sub-test scores for kindergarten, first, and second grade students. Specifically, the test was designed to answer questions concerning the duration of the articulation and pause components of the letters, numbers, and objects sub-test of the R.A.N.

Figure 11:
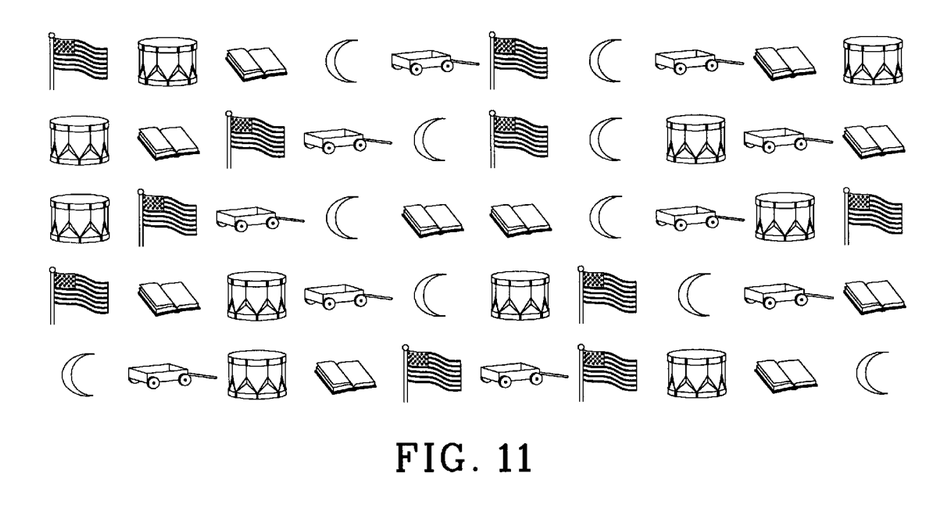
FIG. 11 is a chart presenting the 5 epochs in the Object R.A.N. sub-test.

All 73 students were tested during the first two weeks in December, 1992, and again in May, 1993. The first graders were tested again in May, 1994 using the Woodcock and Johnson Revised (WJ-R) psycho-educational battery (Published in 1989 by DLM). Some tests given during December, 1992, and May, 1993, to conduct this study were the following:

R.A.N Objects: FIG. 11 is a chart presenting one example of 5 epochs used in the Object R.A.N. sub-test.

Figure 10:
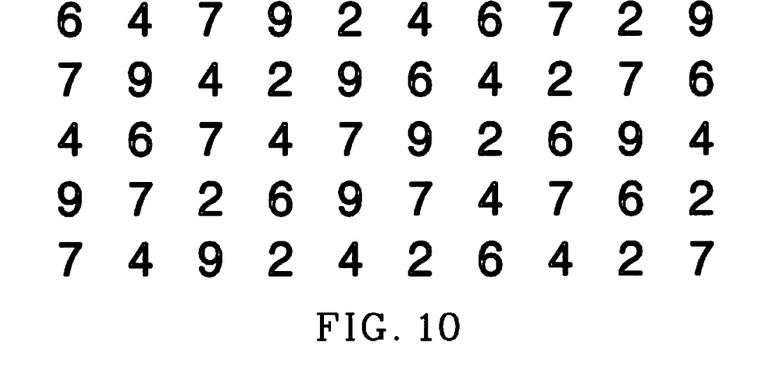
FIG. 10 is a chart presenting the 5 epochs in the Number R.A.N. sub-test.

R.A.N. Numbers: FIG. 10 is a chart presenting one example of 5 epochs used in the Number R.A.N. sub-test.

Figure 9:
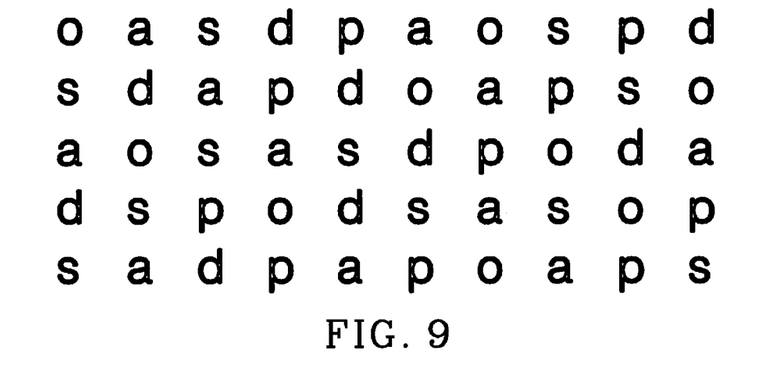
FIG. 9 is a chart presenting the 5 epochs in the Letter R.A.N. sub-test.

R.A.N. Letters: FIG. 9 is a chart presenting one example of 5 epochs used in the Letter R.A.N. sub-test.

The three R.A.N. sub-tests were administered to the subjects in the following order: common objects was administered first, with the numbers and letters administered in a counterbalanced fashion. The children were assessed in a quiet room with minimal distraction.

The R.A.N. sub-test responses were taped using the Casio #DAT 100 portable audio recorder. Before recording began, a small microphone was clipped onto each subject's shirt within six inches of their mouth. An audio check was run to establish the optimum signal to noise ratio for each subject. The subject was then asked to name the first five items on each chart, and provided corrective feedback if necessary. The subject was then instructed to name all the items on each chart as quickly as possible. The subject's responses to all three sub-tests were tape recorded and subsequently the tapes were fed through Wave for Windows 3.1 a wave editing software, available from Turtle Beach Systems, York, Pa. The waves were then coded for analyses.

A separate R.A.N. audio wave file was created for each of the subject's sub-tests. The majority of subjects had three audio wave files, but a number of kindergartners had only one wave file, reflecting participation solely in the objects sub-test. Limitation to the objects sub-test occurred as only one quarter of the kindergarten class recognized letters and numbers on a consistent basis. Each audio wave file contained both the subject's appropriate responses and extraneous remarks, and also a random level of background noise. The background noise was variable in nature, reflecting the natural environmental sounds of a school, and resulted from being recorded as a part of a field study. This study sought to control the influence of background noise on the measurement of the articulation durations by establishing a mean background noise threshold for each sound file. To consistently determine the actual onset of each articulation in spite of interference by the variable background noise, a sample of 200 background noise segments were randomly selected from each R.A.N. file. The absolute value of the percentage of amplitude at each of these 200 sampled noise points was recorded, and a mean noise level was derived. The horizontal axis of the wave file was then set at the mean noise level. Separately, each sound file was determined to have a mean noise level of 1% of the absolute value of amplitude of the sound file.

Articulation onset was determined to be at the point where the existence of properly sequenced meaningful acoustical energy exceeded the mean noise level for a duration of more than 5 ms. and conversely, offset was determined to be at the point where meaningful acoustical energy dropped below the mean noise level for a duration of more than 5 ms. Each articulation duration was hand marked at the onset and offset points. Articulation duration was determined to be the time between onset and offset. Pause duration or cognitive processing speed was determined to be the time between the articulations. Total time of each R.A.N. file was measured from the onset of the first articulation to the offset of the fiftieth articulation.

Each sub-test total time was conceptualized as Total Time=Articulation time+Pause Time. Total articulation time consisted of the summation of all subject generated correct sequenced responses to the displayed stimuli. Pause time consisted of the summation of all silences and extraneous noises including spontaneous speech between the appropriately sequenced articulations. All pause and articulation segments were measured to the nearest thousandth of a second.

In order to minimize error and to enhance the consistency of sub-test data, only R.A.N. sub-tests with a complete sequence of numbers, letters, or objects were included in the statistical analyses. This eliminated one out of 194 R.A.N. data files. It did not eliminate files involving self corrections, preservations, or inclusions of extraneous responses. Extraneous vocalizations were considered as cognitive processing speed or pause time as they are assumed to be a result of variability of attentional focus or of attempts to approximate the correct response.

The majority of audio wave forms representing speech segments on each R.A.N. file were clearly and easily defined using the above described algorithm. Some articulations existed that were not definable using the above method due to the fact that an articulation could run into another articulation forming a wave shape that did not descend to the horizontal axis at all, or one that did not extend to the horizontal axis for the prescribed duration of more than 5 ms.

If the wave shape was irregular in visual shape and was not marked by the previously described demarcation rule, additional arbitrarily designated determinants present in the visual and audio portions of the wave shape were used to delineate the actual onset and offset time. Specifically, visual wave shape inspection was coupled with an audio play back of the sound bit of interest. A determination of articulation onset was established at the first point of appropriate sound recognition which was coupled with a necessarily acute increase or decrease of acoustical energy relative to the more consistent sound portions of the preceding or succeeding articulation.

Results

Figure 2:
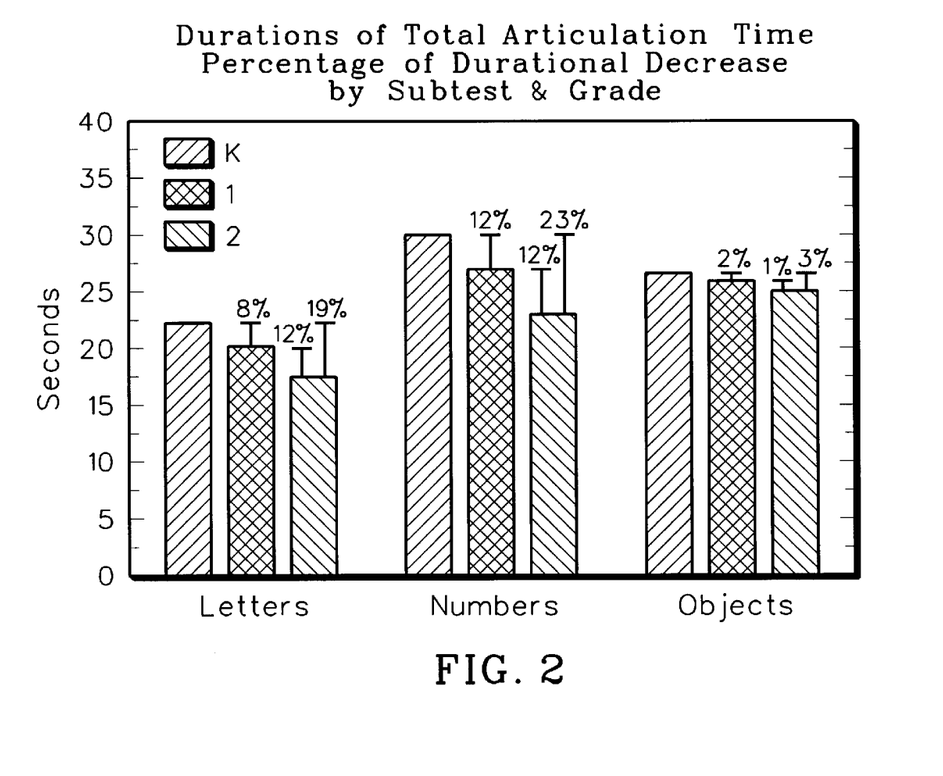
FIG. 2 is a graph illustrating the variation in the duration of total articulation time and percentage of durational decrease by sub-test and grade.

FIG. 2 is a graph illustrating the variation in the duration of total articulation time and percentage of durational decrease by sub-test and grade. The total articulation time variable demonstrated decreasing total articulation times between K-2 for each sub-test. Letter articulation time decreased 19% between kindergarten and second grade, with a larger decrement (12%) occurring between first and second grade. There was an 8% difference in letters articulation time between K and 1. Numbers articulation time between K and 2 decreased more than other sub-tests and was down 23%. Numbers articulation reductions between K-1 and between 1-2 were an equivalent 12%. Objects articulation also decreased across grades, however the reduction was minimal and was assumed to represent a naturally occurring increase in general articulation speed as maturation occurred. Objects was a sub-test with stimuli chosen to be examples of easily recognized and over-learned stimuli. Three types of stimuli, wagon, drum, and book have also been presented as having age of acquisition norms <3 years of age. Objects articulation time decrease between K-2 was 3%, with a 2% difference occurring between K-1, and a 1% occurring between 1-2. Decrease in specific stimuli articulation duration greater than that found on the general knowledge objects measure was thought to occur as a result of increased familiarity with the letters and numbers stimuli during the time from K-2. In other words, stimulus familiarity makes articulation faster.

The articulation component was also compared across sub-tests. Although each sub-test had 50 stimuli, the letters stimuli consisted of 50 syllables, and the numbers and objects stimuli each contained 60 syllables. One two-syllable word, e.g. "seven" and "wagon", was contained in the numbers and objects sub-tests, respectively. The letters articulation time had the quickest of all sub-tests' articulation durations in all grades. Articulation time of the numbers sub-test was the slowest of all the sub-tests in kindergarten. By first grade, the total articulation time was about equivalent for the numbers and objects sub-tests, and by second grade, the objects sub-test total articulation time was greater than that of the numbers sub-test.

The pause component of the R.A.N. was assumed to be an index of cognitive processing time. This measure was the total amount of time each child was recognizing and accessing the appropriate phonological representations and preparing for an articulation.

Figure 3:
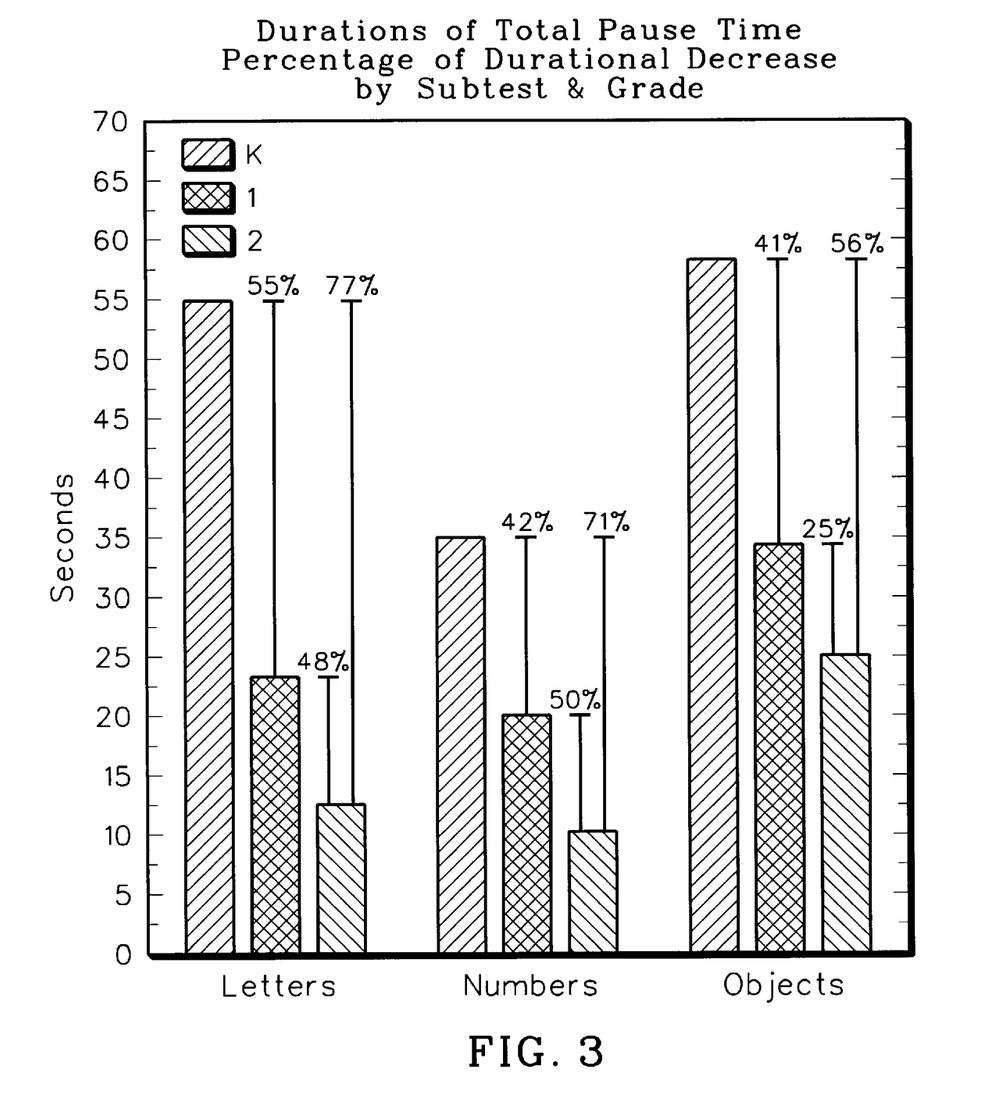
FIG. 3 is a graph illustrating the variation in the duration of total pause time and percentage of duration decrease by sub-test and grade.

FIG. 3 is a graph illustrating the variation in the duration of total pause time and percentage of duration decrease by sub-test and grade. FIG. 3 shows all sub-test pause time latencies divided by grade. Total pause times on all R.A.N. sub-tests indicated that all total pause times declined as the grade level increased. The objects sub-test had the largest pause duration of any sub-test in all grades. The numbers sub-test had the smallest pause duration of any sub-test in all grades. The two tests of specific knowledge had the greatest decrease in pause time across grade level. The letter sub-test had the greatest percentage difference between K and 2. The second grade letters pause processing duration was 77% less than that of the Kindergarten duration, and a larger percentage of the difference occurred between K and 1. Numbers had a 71% decrease in pause time between K and 2, with a larger share of difference between grades 1 and 2. The object sub-test had the smallest decrease in pause time between K and 2, with an overall difference of 56%.

Figure 4:
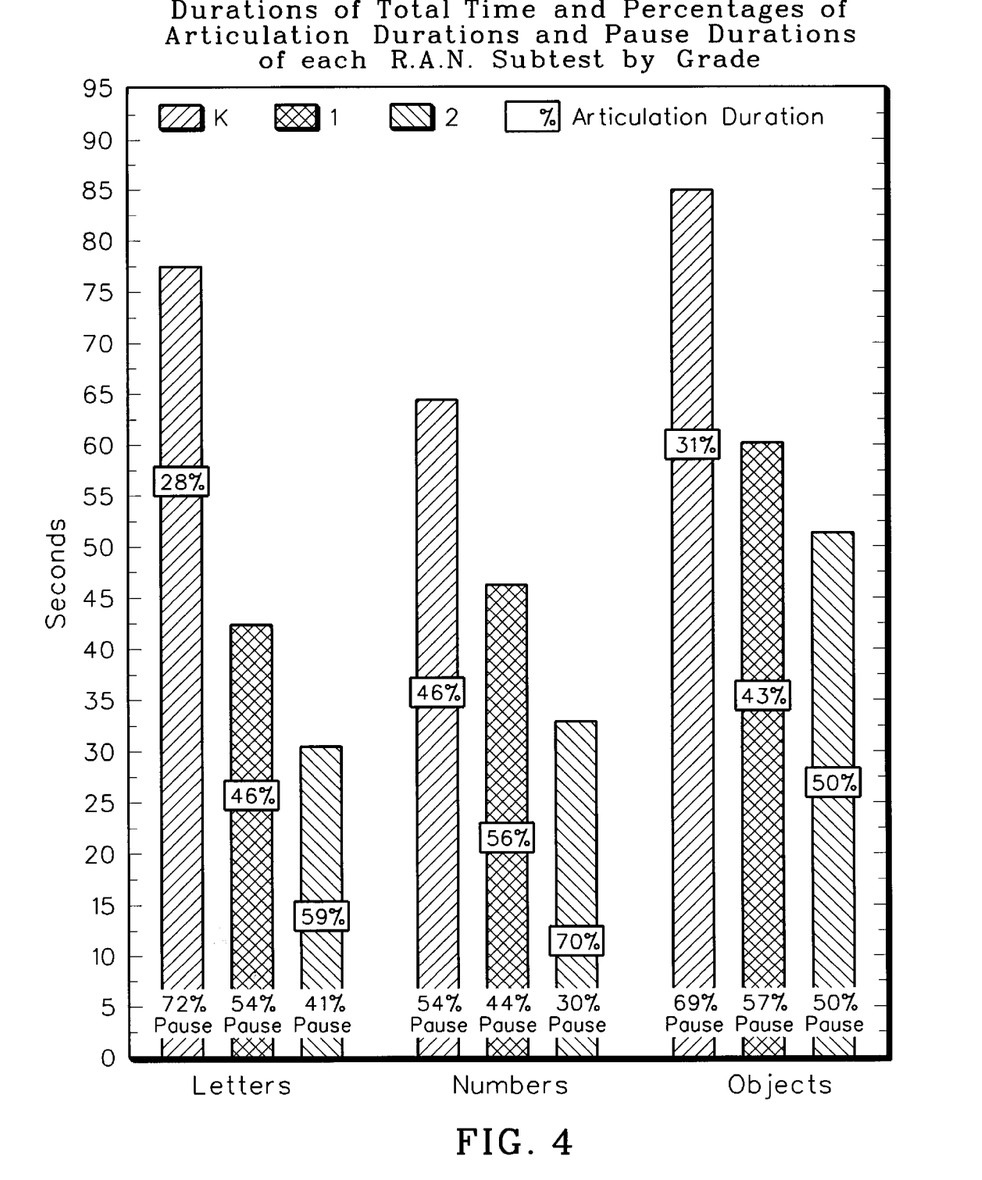
FIG. 4 is a graph illustrating the variation in the duration of total time and percentage of articulation duration and pause durations of each R.A.N. sub-test by grade.

FIG. 4 is a graph illustrating the variation in the duration of total time and percentage of articulation duration and pause durations of each R.A.N. sub-test by grade. At the kindergarten level, the total articulation time was the smaller percentage of the components in all of the sub-tests, with total pause time being the larger portion of all sub-tests' total time. By grade 1 total pause times and total articulation times of the sub-tests were reduced, but total articulation time reduction was more modest than total pause time. In grade 1 letters and objects sub-tests' pause durations were a larger percentage of the total time. The grade 1 numbers sub-test consisted of more articulation time than actual pause time. By grade 2, total articulation duration commanded the majority of the time within the total time measures of the letters and numbers sub-tests, and the object sub-test total time was equally divided between the pause and articulation components.

Figure 5:
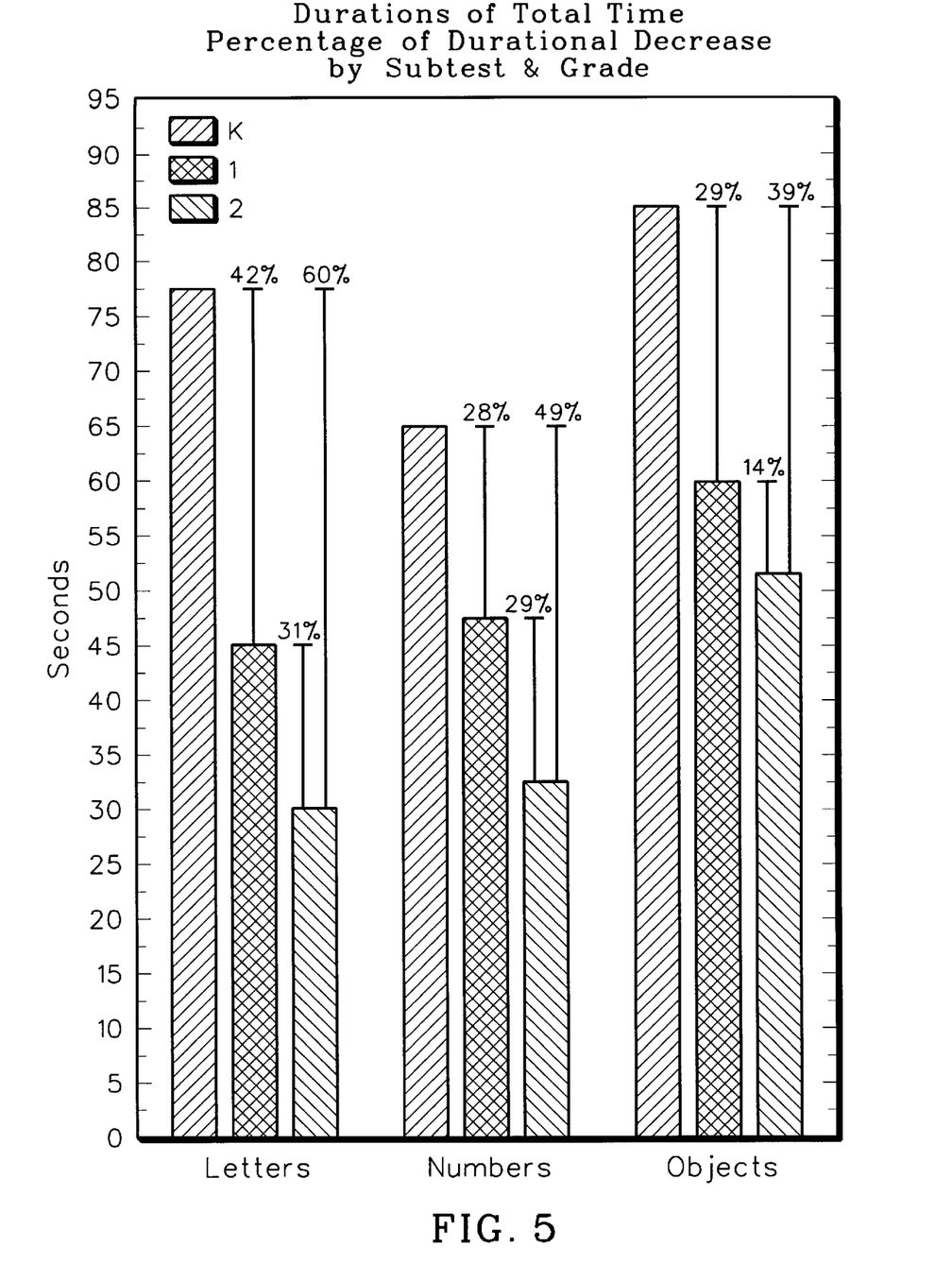
FIG. 5 is a graph illustrating the variation in the duration of total time and percentage of duration decrease by sub-test and grade.

FIG. 5 is a graph illustrating the variation in the duration of total time and percentage of durational decrease by sub-test and grade. The total time was originally conceptualized as a measure of verbal retrieval, and the speed of verbal retrieval varied both across grades and sub-tests. However, when the process of verbal retrieval was further refined, it became apparent that the process was determined by the combination of the two sub-processes, that also differed in speed and proportion of the total time across sub-tests and grades. The resulting variations of these two component times across sub-tests and grades elegantly demonstrated how small quantitative changes resulted in qualitatively different measures. The kindergarten sub-tests were dominated by pause time, however as pause and articulation time were both reduced, the rate of reduction was not consistent within the component, the sub-test, or between the grades. These inconsistent reductions resulted in nine qualitatively different total time measures. It appeared to be difficult to understand the nature of verbal retrieval without a measure that guaranteed the homogeneity of the underlying processes. Consequently, the articulation and pause component are thought to be purer measures that more directly related to underlying processes.

Figure 6A:
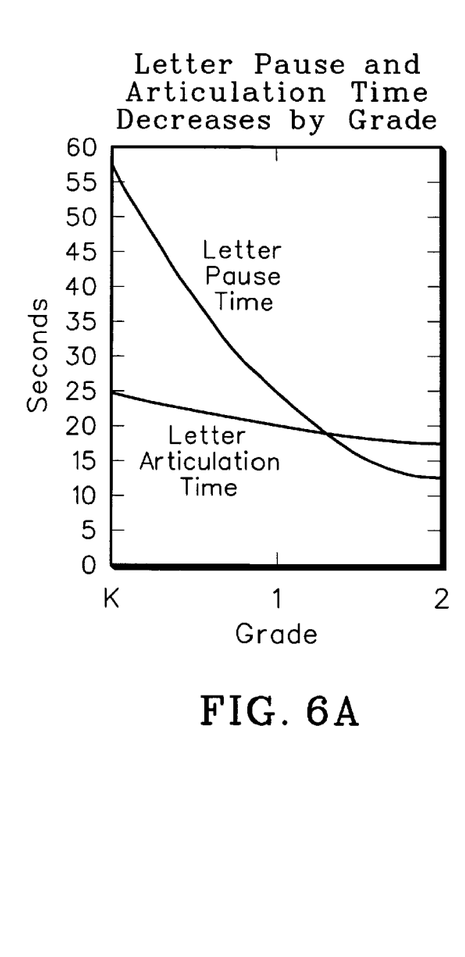
FIG. 6(a) is a graph illustrating the evolution of the Letter pause and articulation times as functions of the grade of the tested subjects.
Figure 6B:
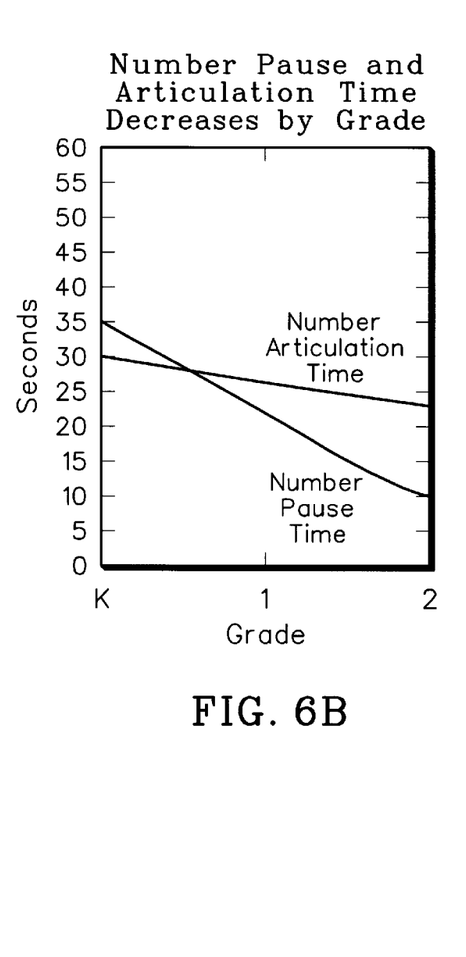
FIG. 6(b) is a graph illustrating the evolution of the Number pause and articulation times as functions of the grade of the tested subjects.
Figure 6C:
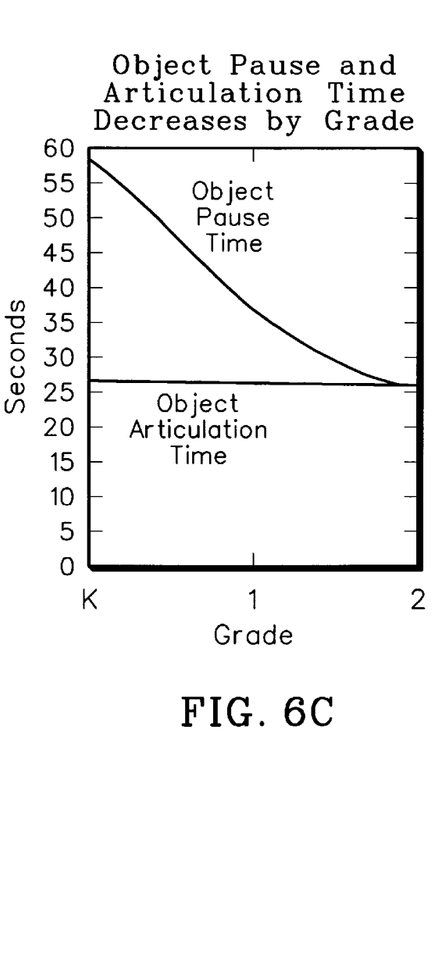
FIG. 6(c) is a graph illustrating the evolution of the Object pause and articulation times as functions of the grade of the tested subjects.

FIGS. 6(a–c) are graphs illustrating the evolution of the Letter, Number and Object pause and articulation times as functions of the grade of the tested subjects. The component characteristics, pause and articulation component latencies did decrease from K-2 for all sub-tests; however, not all decreases were of a magnitude to reach statistical significance. Component latencies associated with the tasks of naming of specific stimuli had greater reduction from K-2 than latencies associated with the general naming task. This latency reduction statistically demonstrated significantly different pause latencies across grade levels for the numbers and letters sub-tests; however, on the general knowledge task of objects, pause latencies did not significantly differ between all grades. Pause latencies were also found to differ on the linear component between the letter and objects sub-tests, however they did not differ between the numbers and objects sub-tests or the numbers and letters sub-test. This suggests that letters pause was similar to numbers pause, that numbers pause was similar to objects, but letters was dissimilar from objects pause. Importantly, the pause component was the portion of the total time latency that varied widely enough between students to mirror the great variety of students' reading ability.

The R.A.N. letters pause time seems to be the optimal R.A.N. variable to predict concurrent reading ability as well as future reading ability. It is predictive precisely because it eliminates the obscuring articulation component and allows a more direct measurement of the efficiency or speed of access and retrieval of the student's letter knowledge.

Figure 7:
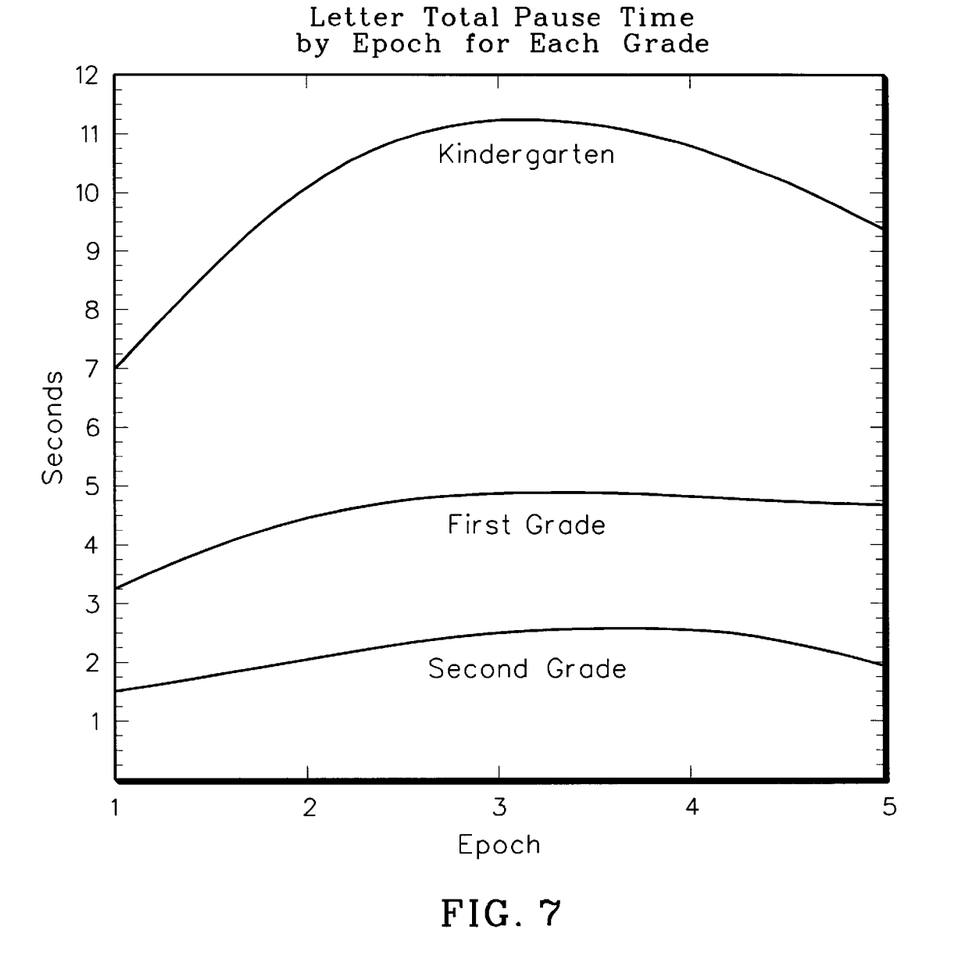
FIG. 7 is a graph presenting the variation Letter total pause time by epoch for each grade.

FIG. 7 is a graph presenting the variation Letter total pause time by epoch for each grade. FIG. 7 illustrates typical letter epoch pause processing that occurred during the sub-tests. Hierarchical linear modeling was used to statistically determine the component variation between the five epochs that comprised the intra-sub-test processing of each sub-test. The analyses clarified typical temporal trends associated with the components specific to each sub-test. To clarify epoch trends, analyses were calculated separately by sub-test type and component.

Figure 8A:
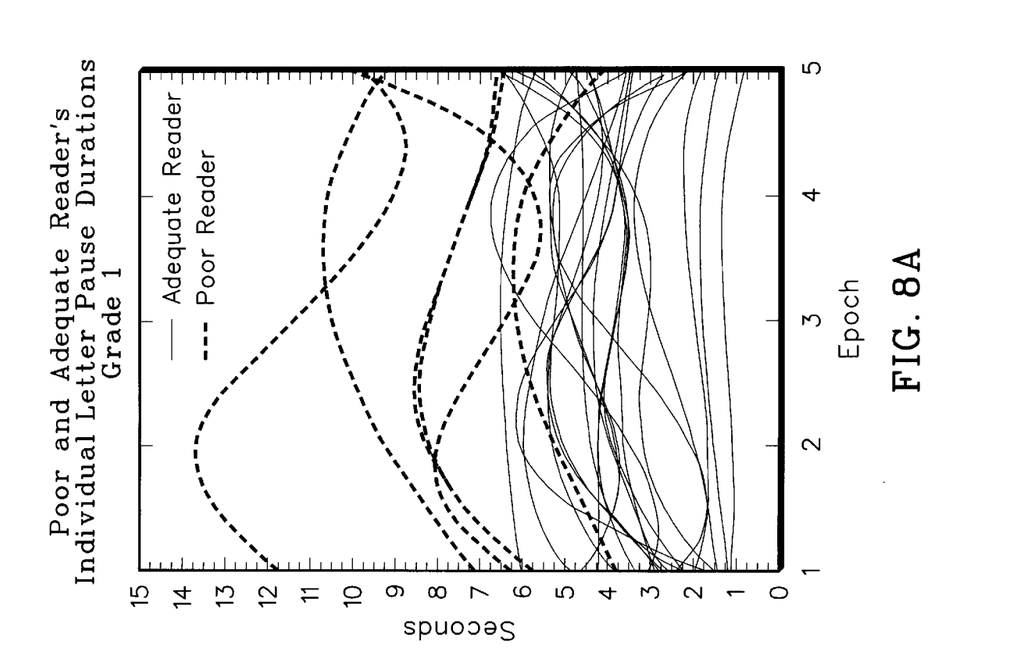
FIG. 8(a) is a graph showing the variation of Letter pause durations for adequate and poor Grade 1 readers.
Figure 8B:
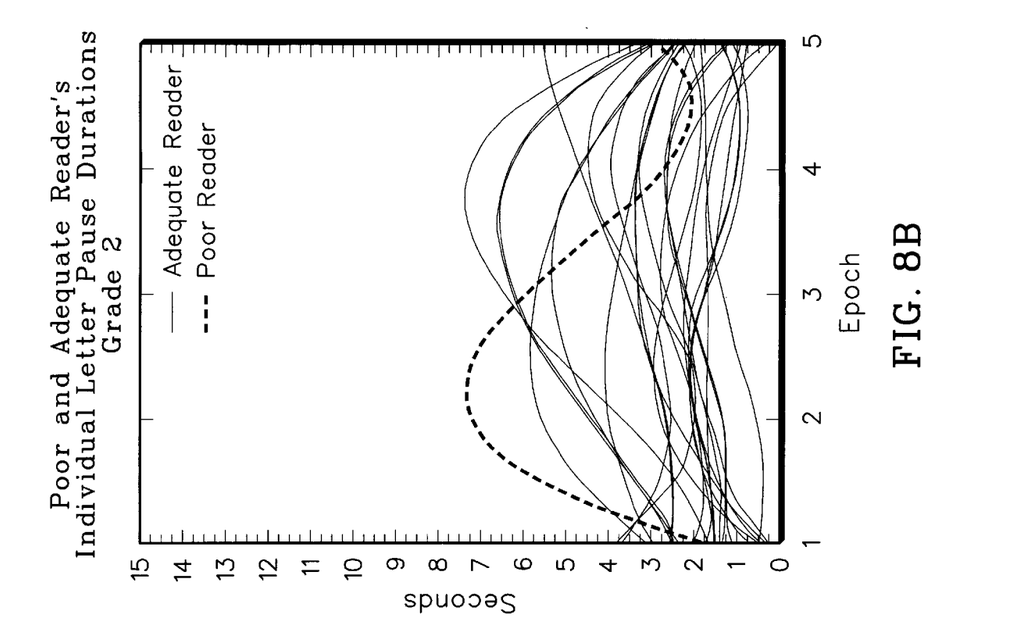
FIG. 8(b) is a graph showing the variation of Letter pause durations for adequate and poor Grade 2 readers.

FIGS. 8(a–b) show the variation of Letter pause durations for adequate and poor Grade 1 and Grade 2 readers respectively. Individual student letters epoch progress was graphed and the diverse nature of individual temporal processing was observed. After identifying the poor readers, it appeared that inflated total pause durations of the poor readers was not due to fatigue, or slower processing of each epoch, but to inconsistency of epoch processing.

A measure of the observed inconsistency was conceptualized as the amount of variation in each student's letters epoch pause latency relative to his/her own letters pause epoch mean. For each student, a mean of the individual's 5 epoch latencies was created, and the variance of that mean was designated as the variable most likely to quantify letters epoch pause consistency. The letters pause epoch mean variance of the first grade students (n=25) was calculated to be 2.667 seconds. The mean variance of the poor reader group (n=5) was 4.573 seconds, and the mean variance of the adequate reader group (n=18) was 2.3519 seconds.

The letters pause epoch processing variance was then correlated with total letters pause duration, letters epoch means, and WJ-R reading scores. All reading correlations were significant. These significant associations demonstrated the increased variability of processing speed as the student's total letter pause time increased, but importantly it quantified the significant association between reading and letter pause epoch variance. Specifically, as reading scores improved, letter pause variance was reduced (r=−0.44). Adequate readers typically had more consistent letters naming epoch latencies, and poor readers had greater inconsistency of pause processing. This finding suggests that consistency is a factor in reading proficiency.

Analysis of variance was used to determine any statistical difference of the mean epoch variance between the reading groups. This analysis was significant (F=10.46, 1/22, p<0.01), indicating greater epoch pause variance in the poor reader group. Despite a very small poor reader sample (n=5), and a small adequate reader group (n=18), poor readers were not only significantly different in their total letters pause duration, but also significantly different in their temporal consistency.

A multiple regression was then run for first grade students (n=23) to determine if the mean epoch pause variance or consistency added significant predictive variance to the relation between total letters pause duration and reading. Epoch pause variance did add significant unique variance to the letter pause time prediction of reading (F=4.11, 1/20, p<0.0562), and epoch variance combined with total pause time accounted for 74% of the variance predictive of reading. The reported r-square of 0.7624 was adjusted to 0.7387 during regression analysis due to small sample size.

A review of the original tape recordings was also initiated to determine the presence of extraneous noises, coughs, or articulations. Review revealed numerous extraneous letter name additions in 3 of the 5 poor reader's letter sub-test responses. These extraneous insertions numbered 8, 4, and 3, for the first, third, and fourth poor reading respondents, respectively. This number exceeded the mean number of intrusions (1.23) on the letters sub-tests of all subjects in kindergarten, first, and second grades. These intrusions may represent poor student inhibition of incompletely formed letter responses. Poor readers' slowed processing time, increased intrusions during sub-test responses, and inconsistency of letters epoch pause latencies appeared to be the result of an attentional inefficiency.

While the foregoing is directed to the preferred embodiment of the present invention, other and further embodiments of the invention may be devised without departing from the basic scope thereof, and the scope thereof is determined by the claims which follow.

What is claimed is:

1. A method for analyzing reading and attention skills, comprising:
   providing a series of naming elements;
   detecting a response as a user reads the naming elements; and
   determining the duration of pauses in the response.

2. The method of claim 1 wherein the naming elements are arranged in epochs, and further comprising determining the variance of total pause duration between epochs.

3. The method of claim 1 further comprising providing suggested activities for addressing the variance.

4. The method of claim 1 further comprising providing a second series of naming elements after the pause time is less than a given value.

5. The method of claim 1 further comprising comparing the detected response to an expected response.

6. A method for analyzing reading and attentional skills comprised of:
   detecting sound waves generated by a subject's voice in response to a series of stimuli;
   wherein the digitized sound waves are characterized by sets of points, each point having a time coordinate and a sound amplitude coordinate;
   determining articulation and pause periods wherein each articulation period is defined by an articulation onset point and an articulation offset point; and each pause period is defined by a pause onset point and a pause offset point; and
   analyzing the sequence of articulation and pause periods.

7. The method of claim 6 wherein articulation onset points are set along the sound waves at points where wave amplitude increases to exceed a given first value, and articulation offset points are set along the sound waves at points where wave amplitude drops below a given second value.

8. The method of claim 7 wherein determination of articulation and/or pause periods comprises manipulation of one or more time coordinates.

9. The method of claim 7 wherein for each set of first and second articulation onset points separated by an articulation offset point, pause periods are determined by subtracting the time coordinate of the articulation offset point from the time coordinate of the second articulation onset point.

10. The method of claim 6 wherein pause onset points are set along the sound waves at points where wave amplitude drops below a given first value, and pause offset points are set along the sound waves at points where wave amplitude increases to exceed a given second value.

11. The method of claim 10 wherein for each set of first and second pause onset points separated by a pause offset point, pause periods are determined by subtracting the time coordinate of the first pause onset point from the time coordinate of the pause offset point.

12. The method of claim 10 wherein for each set of first and second pause onset points separated by a pause offset point, articulation periods are determined by subtracting the time coordinate of the pause offset point from the time coordinate of the second pause onset point.

13. The method of claim 6 further comprised of determining a mean noise level associated with the sound waves and setting the mean noise level as the zero point of the sound wave amplitude scale.

14. The method of claims 9 and 11 further comprised of analyzing pause periods and determining the subject's reading profile, the profile comprising a number of indicators characterizing reading and attentional deficiencies in the subject' response to one or more stimuli.

15. The method of claim 14 further comprised of providing the subject with letter retrieval, recognition, and articulation drill exercises to correct the reading deficiencies.

16. The method of claims 8 and 12 further comprised of analyzing articulation periods and determining the subject's reading profile, the profile comprising a number of indicators characterizing diagnosed reading deficiencies in the subject's reading skills.

17. The method of claim 16 further comprised of providing the subject with letter retrieval, recognition, and articulation drill exercises to correct the diagnosed reading deficiencies.

18. The method of claim 6 wherein articulation onset points are set along the sound waves at points where wave amplitude increases to exceed a given first value for at least a first given duration, and articulation offset points are set along the sound waves at points where wave amplitude drops below a given second value for at least a second given duration.

19. The method of claim 6 wherein pause onset points are set along the sound waves at points where wave amplitude drops below a given first value for at least a first given duration, and pause offset points are set along the sound waves at points where wave amplitude increases to exceed a given second value for at least a second given duration.

20. The method of claim 6 wherein the stimuli are sub-tests selected from an R.A.N. battery of reading tests.

21. A method for analyzing reading and attentional skills, comprising:

providing a series of naming elements;

detecting a response as a user reads the naming elements; and analyzing the frequencies of the responses.

* * * * *